United States Patent
Meli et al.

(10) Patent No.: US 7,542,634 B1
(45) Date of Patent: Jun. 2, 2009

(54) LOW LOSS, NOISE FILTERING MULTIPLEXER/DEMULTIPLEXER FOR RECONFIGURABLE OADMS

(75) Inventors: Fausto Meli, Piacenza (IT); Valerio Viscardi, Paderno Dugnano (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/671,111

(22) Filed: Feb. 5, 2007

Related U.S. Application Data

(63) Continuation of application No. 10/630,582, filed on Jul. 29, 2003, now Pat. No. 7,181,095.

(51) Int. Cl.
G02B 6/28 (2006.01)
H04J 14/02 (2006.01)

(52) U.S. Cl. .......................... 385/24; 398/83
(58) Field of Classification Search .......... 398/83; 385/24
See application file for complete search history.

(56) References Cited

U.S. PATENT DOCUMENTS

| | | | |
|---|---|---|---|
| 6,433,921 B1 | 8/2002 | Wu et al. | |
| 6,587,200 B1 | 7/2003 | Kikuchi et al. | |
| 6,658,181 B2 * | 12/2003 | Wang et al. | 385/37 |
| 6,904,240 B1 * | 6/2005 | Suga et al. | 398/79 |
| 2002/0041574 A1 * | 4/2002 | Du et al. | 370/300 |
| 2003/0223682 A1 * | 12/2003 | Kinoshita et al. | 385/24 |
| 2004/0062557 A1 * | 4/2004 | Takashima et al. | 398/209 |

FOREIGN PATENT DOCUMENTS

JP 2001197006 A 7/2001
WO 03/034111 A2 4/2003

OTHER PUBLICATIONS

Kaneko, Akimasa et al., "Design and Applications of Silica-Based Planar Lightwave Circuits," IEEE Journal of Selected Topics in Quantum Electronics, vol. 5, No. 5, Sep./Oct. 1999, pp. 1227-1236.
Ramaswami, R. et al., "Optical Networks: A Practical Perspective," pp. 112-115, 1998.
Tomkos, I. et al., "Ultra-Long-Haul DWDM Network with 320×320 Wavelength-Port 'Broadcast & Select' OXCs," European Conference on Optical Communication, Sep. 2002, Copenhagen, Denmark, post-deadline paper PD2.1.
Tomkos, I. et al., "80×10.7 Gb/s Ultra-Long Haul (4200+ km) DWDM Network with Reconfigurable 'Broadcast & Select' OADMs," Optical Fiber Communication Conference 2002, post-deadline paper FC1.
Vasilyev, M. et al., "Transparent Ultra-Long Haul DWDM Networks with 'Broadcast & Select' OADM/OXC Architecture," Journal of Lightwave Technology, 2002, 20, 2661.
Vasilyev, M. et al., "Broadcast & Select OADM in 80×10.7 Gb/s Ultra-Long Haul Network," IEEE Photon. Technol. Lett., 2003, 15, 332.

\* cited by examiner

*Primary Examiner*—Jerry T Rahll
(74) *Attorney, Agent, or Firm*—Edell, Shapiro & Finnan, LLC

(57) ABSTRACT

Agile OADM structures having a range of tradeoffs between costs and flexibility are disclosed. In certain implementations, cyclic AWGs (arrayed waveguide gratings) are employed. Excellent optical performance is achieved along with relatively low initial and upgrade costs. An economically optimal level of network flexibility may thus be achieved.

12 Claims, 14 Drawing Sheets

LOW LOSS, NOISE FILTERING MULTIPLEXER/DEMULTIPLEXER FOR RECONFIGURABLE OADMS

CROSS-REFERENCE TO RELATED APPLICATIONS

This application is a continuation of U.S. application Ser. No. 10/630,582 filed Jul. 29, 2003, which is incorporated herein by reference in its entirety.

BACKGROUND OF THE INVENTION

The present invention relates to optical networking and more particularly to systems and methods for Wavelength Division Multiplexing (WDM) communications.

Impressive strides have been made in the development of WDM communication links. Modern WDM communication links can carry a large number of wavelengths each modulated by a very high data rate signal. Also, the distance over which WDM signals can be transmitted without regeneration by way of optical-electrical-optical conversion has been increased. Furthermore, the distance between purely optical amplification sites along such links has increased.

Telecommunication service providers are, however, also very interested in the economic performance of WDM communication links. Revenue garnered by such links may be low initially and then grow over time as traffic increases. To allow profitable operation even before the maturation of traffic growth, it is desirable to install capacity in stages to the extent that technology allows. Rather than initially installing all of the optical components and systems necessary for a full capacity link immediately it is preferable to set up a modularized architecture where lower cost partial initial deployments are possible.

To support this type of modular installation and upgrade path, it is important to provide an agile optical add-drop multiplexer (OADM) architecture. An OADM adds and/or drops wavelengths of a WDM signal. In the typical traffic growth scenario, the number of added/dropped wavelengths will grow over time. A conventional WDM that fulfills the maximum expected add/drop capacity requirement will be very costly relative to initial revenues.

There are known WDM structures that provide the needed flexibility. Although OADM flexibility postpones certain costs into the future, flexibility itself may also carry a cost due to the types of components that are used. It is thus necessary to find the right trade-off between required flexibility in installation plus upgrade costs.

Flexible OADM structures are known. One type of known flexible OADM structure provides automatic reconfigurability using, e.g., optical switches. This may be referred to as Reconfigurable OADM (R-OADMs). Another type of flexible OADM is manually reconfigurable using e.g., fiber patch-cords and wavelength selective devices. These manually reconfigurable OADMs can be referred to as Flexible OADMs (F-OADMs). Technologies are available currently for implementing both R-OADMs and F-OADMs. For example, it is known to implement an F-OADM using a multiplexer arrayed waveguide grating (AWG) having a number of input ports corresponding to the maximum number of wavelengths to be added and a demultiplexer AWG having a number of output ports corresponding to the maximum number of wavelengths to be dropped.

The flexibility of the known OADM architectures comes at high initial cost and thus does not support the desired business model. Furthermore, many of the current agile architectures suffer from poor optical performance, e.g., high insertion loss on added/dropped wavelengths and/or injection of additional noise on added wavelengths. Existing fixed OADM structures are cost and performance effective only for low counts of channels to be added or dropped and only where traffic reconfiguration or future growth is not an issue. What is needed are OADM structures that provide reconfigurability to accommodate future growth and changes in traffic, that have good optical performance, and that have relatively low initial and upgrade costs.

DETAILED DESCRIPTION OF THE INVENTION

Figure 1:
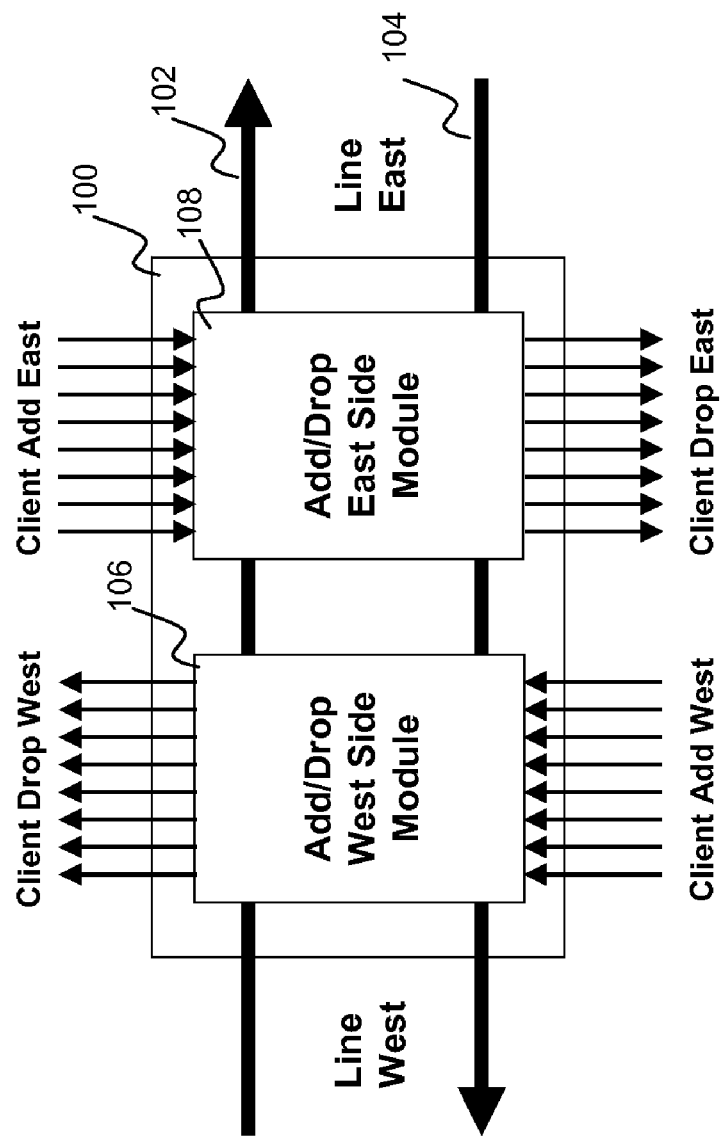
FIG. 1 depicts a top-level representation of OADM functionality.

FIG. 1 depicts a representative OADM architecture to which embodiments of the present invention may be applied. An OADM 100 adds and drops wavelengths of a bi-directional WDM link. The bidirectional link consists of two unidirectional links flowing in opposite directions. One of the unidirectional links 102 is said to flow from west to east. The other unidirectional link 104 can be said to flow from east to west. A west side add/drop module 106 adds wavelengths to the signal flowing to the west and drops wavelengths from the signal flowing from the west. Similarly, an east side add/drop module 108 adds wavelengths to the signal flowing to the east and drops wavelengths from the signal flowing from the east.

Thus it can be seen that an OADM is an optical network element having two bi-directional line interfaces and two bidirectional client (or tributary) interfaces. The OADM is able to extract/insert a subset of wavelengths from/to the incoming/outgoing WDM wavelength set and route these wavelengths to/from the client drop/add interfaces.

The number of individual wavelength client interfaces define the add/drop capacity which can be described as a ratio between the number of wavelengths that can be added or dropped and the total number of wavelengths in the WDM grid. For example, an OADM able to drop up to 16 wavelengths out of a total of 32 has an add/drop capacity of 50%.

To quantify OADM flexibility, it is useful to introduce a parameter that measures the number of supported possible configurations. Assuming an add/drop capacity of 100%, an ideal agile OADM would be able to add/drop any combination of the N wavelengths of the WDM grid. For this ideal case, any particular wavelength may be added/dropped or simply passed through. Each wavelength thus may be understood to have an associated bit ("1" or "0") to describe the add/drop or pass-through state. The number of possible states for this ideal agile OADM is therefore 2N. However, in order to optimize parameters such as cost and optical performance, it may be desirable to provide an agile OADM architecture with less flexibility where certain combinations of states for all the wavelengths are not achievable. The ratio between the number of supported states in a particular agile OADM architecture and the ideal case of 2N states is a useful measure of flexibility.

Figure 2:
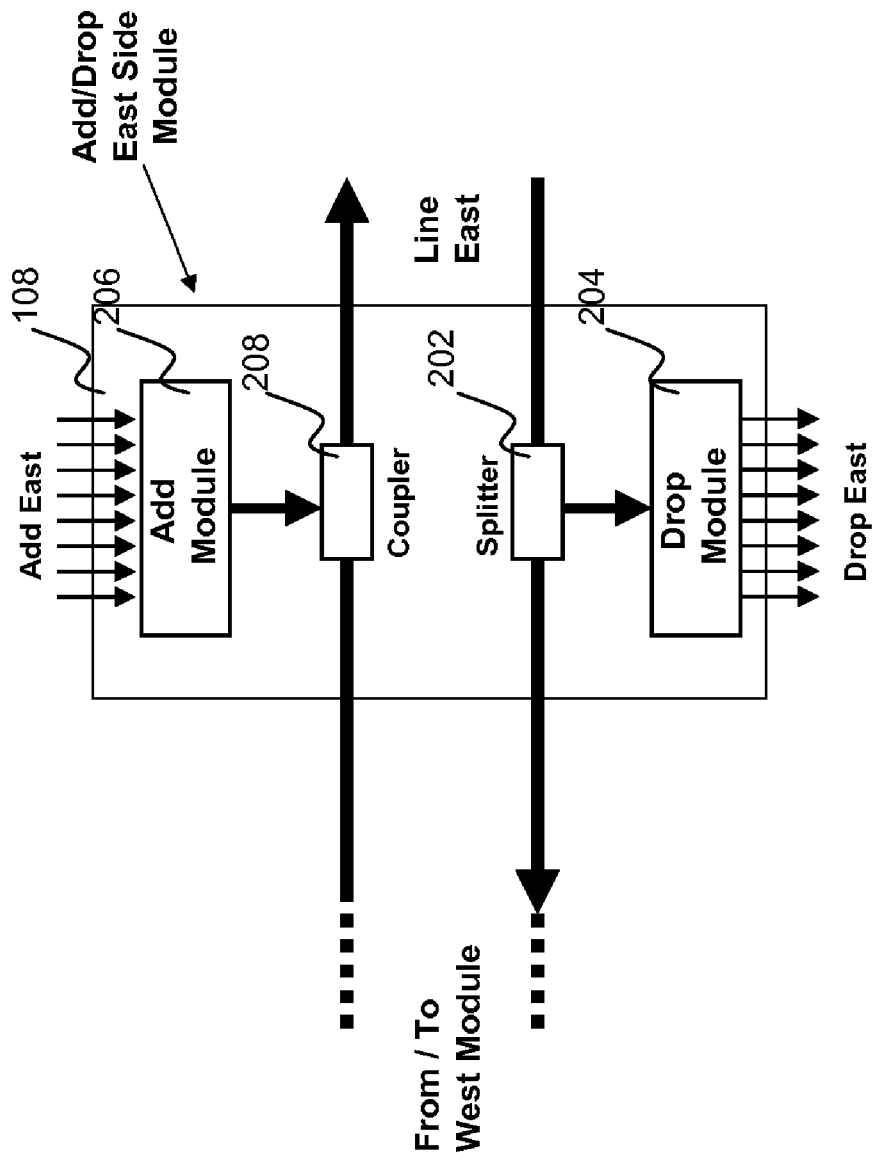
FIG. 2 depicts a split-and-select architecture for an OADM.

FIG. 2 depicts further details of add/drop east side module 108 that employs a so-called "split and select" architecture. For the WDM signal flowing from east to west, a splitter 202 taps off a portion of that WDM signal and forwards it to a drop module 204. Drop module 204 then separates out the various wavelengths to be dropped. Wavelengths to be added to the optical signal flowing from west to east are combined in an add module 206. The combined add signal is then mixed into the west to east WDM signal by a coupler 208. Embodiments of the present invention provide improved implementations of drop module 204 and add module 206.

Add Module

Figure 3:
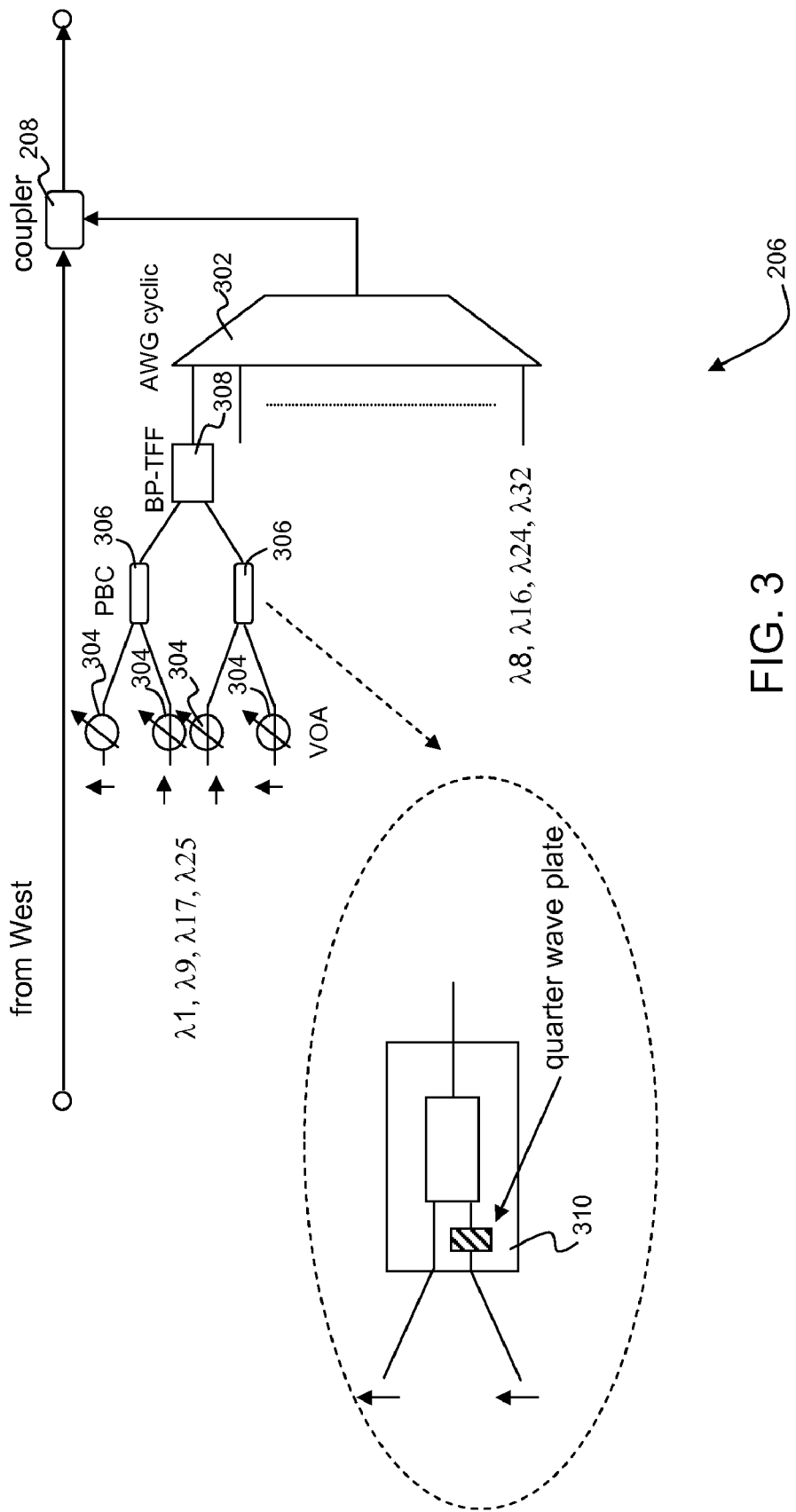
FIG. 3 depicts an add module according to a first embodiment of the present invention.

FIG. 3 shows an add section structure that provides 100% capacity (and 100% flexibility). In the examples described herein, the number of wavelengths in the grid is N=32. In FIG. 3, within add module 206 there is a cyclic arrayed waveguide grating (AWG) 302 that combines wavelengths at P input ports into one output port. Each input port of cyclic AWG 302 accepts N/P wavelengths spaced apart at P times the system's WDM grid spacing. (It will be appreciated that many of the "accepted" wavelengths may not actually be present.) In the example of FIG. 3, a 1:8 cyclic AWG is used for a 32 wavelength grid. In this case each of the P input ports carries four wavelengths. If the overall grid is 100 GHz, each input port grid has a spacing of 800 GHz. Cyclic AWG 302 is wavelength-selective in that at any particular input port the wavelengths other than the accepted ones are rejected. This provides a highly beneficial noise filtering effect not found in previous add structure implementations that combine numerous wavelengths without filtering.

A description of the details of cyclic AWG technology may be found in Kaneko, et al., "Design and Applications of Silica-based Planar Lightwave Circuits," IEEE Journal of Selected Topics in Quantum Electronics, Vol. 5, No. 5, September/October 1999, the contents of which are herein incorporated by reference in their entirety for all purposes. Although the present invention is described with reference to the use of cyclic AWGs for multiplexing and demultiplexing, one may also substitute, e.g., optical interleavers and deinterleavers or other suitable devices.

Although cyclic AWG 302 accepts four wavelengths at each of 8 inputs, all of the wavelengths may not be present at all of the inputs. In fact, it would be very typical that upon initial installation only a few wavelengths are utilized while others are added later. The design of FIG. 3 provides 100% capacity and flexibility by providing separate inputs for each of the 32 wavelengths.

Thus, four wavelengths are combined to produce one input to cyclic AWG 302. Each wavelength is passed through an optional variable optical attenuator (VOA) 304 that maintains polarization. As shown by the horizontal and vertical arrows, each pair of wavelengths is preferably input with linear orthogonal polarization states. This allows combination of the wavelength pairs to be performed by polarization beam combiners 306. The polarization beam combiners may employ, e.g., InP technology, fused fiber technology, etc. The polarization beam combiners 306 introduce relatively low insertion loss, e.g., approximately 0.3 dB, but reduce noise level by causing the noise from each channel to add incoherently. In an alternative embodiment, polarization beam combiner 306 incorporates a quarter waveplate 310 that rotates the linear polarization state of one input by 90 degrees. In this way all of the input wavelengths may have the same linear polarization state, simplifying configuration.

A bandpass thin film filter (BP-TFF) 308 combines the outputs of PBCs 306. BP-TFF 308 is a type of interferential filter that separates or combines two adjacent multi-wavelength subbands. The output of each BP-TFF 308 is fed to one of the P input ports of cyclic AWG 302. Each of the P input ports to cyclic AWG 302 may have a similar structure for combining four wavelengths. Also, it will be seen that the use of the cyclic AWG 302, the polarization beam combiners 306, and the BP-TFF 308 greatly reduce the introduction of optical noise while adding minimal insertion loss.

Figure 4:
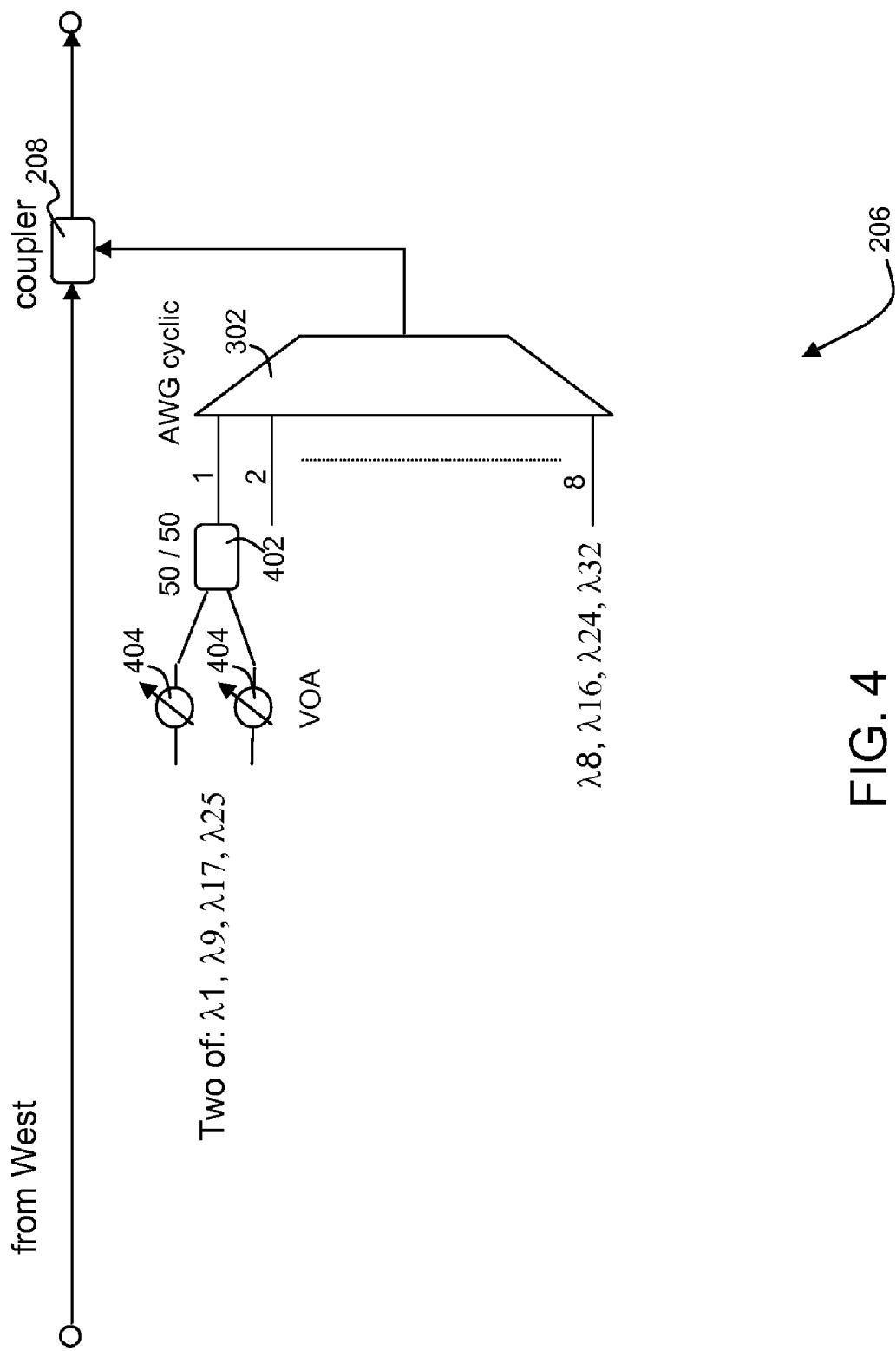
FIG. 4 depicts an add module according to a second embodiment of the present invention.

FIG. 4 depicts an alternative add module having 50% add capacity and 5% add flexibility according to one embodiment of the present invention. In FIG. 4, there are two available inputs for each of the P ports of cyclic AWG 302. Thus one may optionally introduce two of the four possible wavelengths for each of the P input ports. A 50/50 optical coupler 402 combines the two input wavelengths. Both wavelengths each may pass through an optional VOA 404. There is 50% capacity since 16 of 32 channels may be added. The use of a coupler introduces some degree of insertion loss, typically around 3.5 dB. Also since there is no pre-AWG filtering or use of a polarization beam combiner, there is some introduction of out-of-channel noise in the process of combining wavelengths prior to input and a 3 dB optical signal to noise ratio (OSNR) impairment (compared to what would be achieved using a PBC or not input coupling to the cyclic AWG). The cost of this approach is however lower than in the 100% capacity example of FIG. 3.

Figure 5:
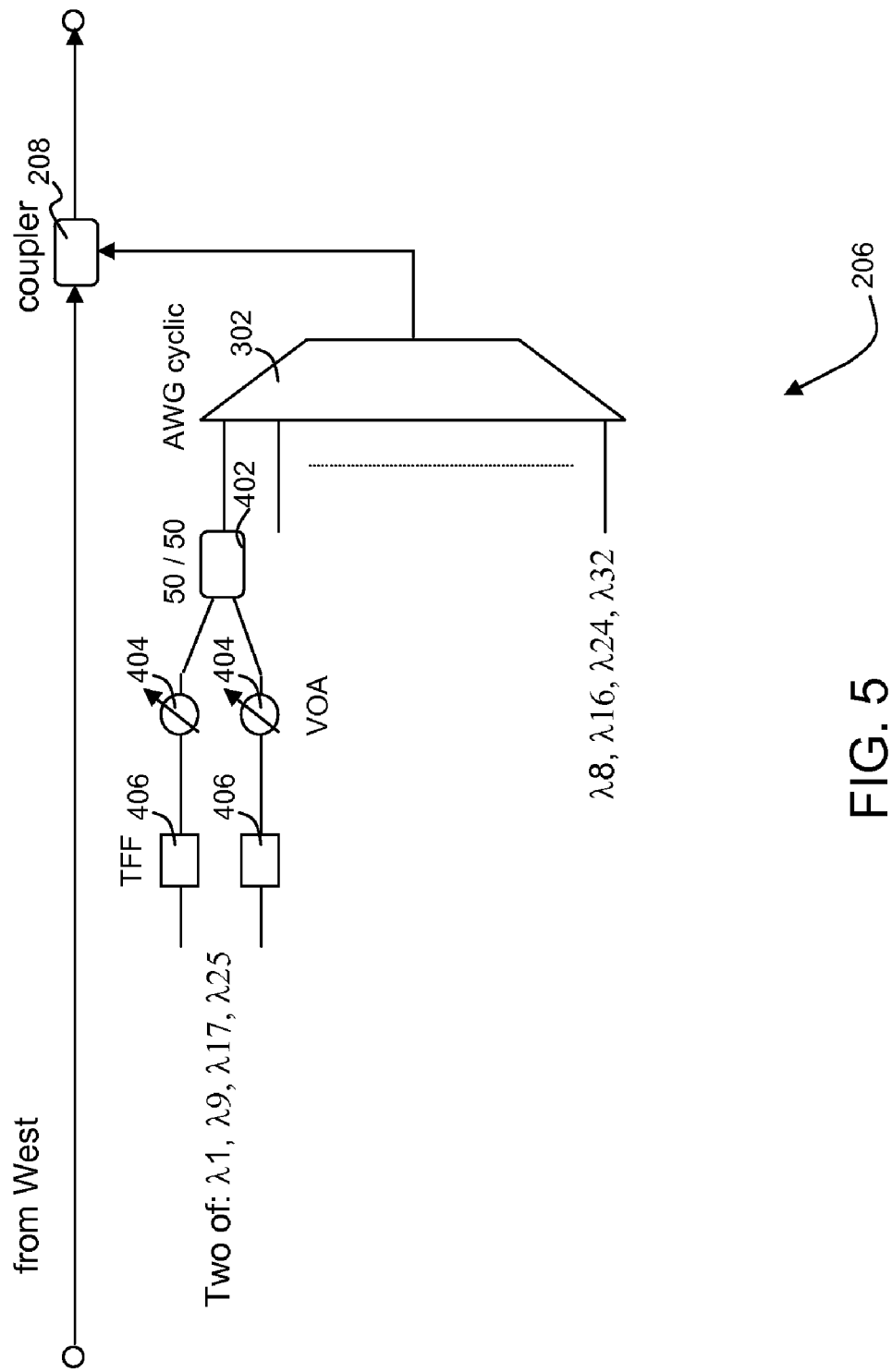
FIG. 5 depicts an add module according to a third embodiment of the present invention.

FIG. 5 depicts a variation of the add module shown in FIG. 4 according to one embodiment of the present invention. TFFs 406 are single-channel bandpass filters introduced on each wavelength input. This increases insertion loss but filters the noise introduced on each input so that there is 0 dB OSNR impairment. Each TFF 406 is centered at the particular input wavelength for that input.

Figure 6:
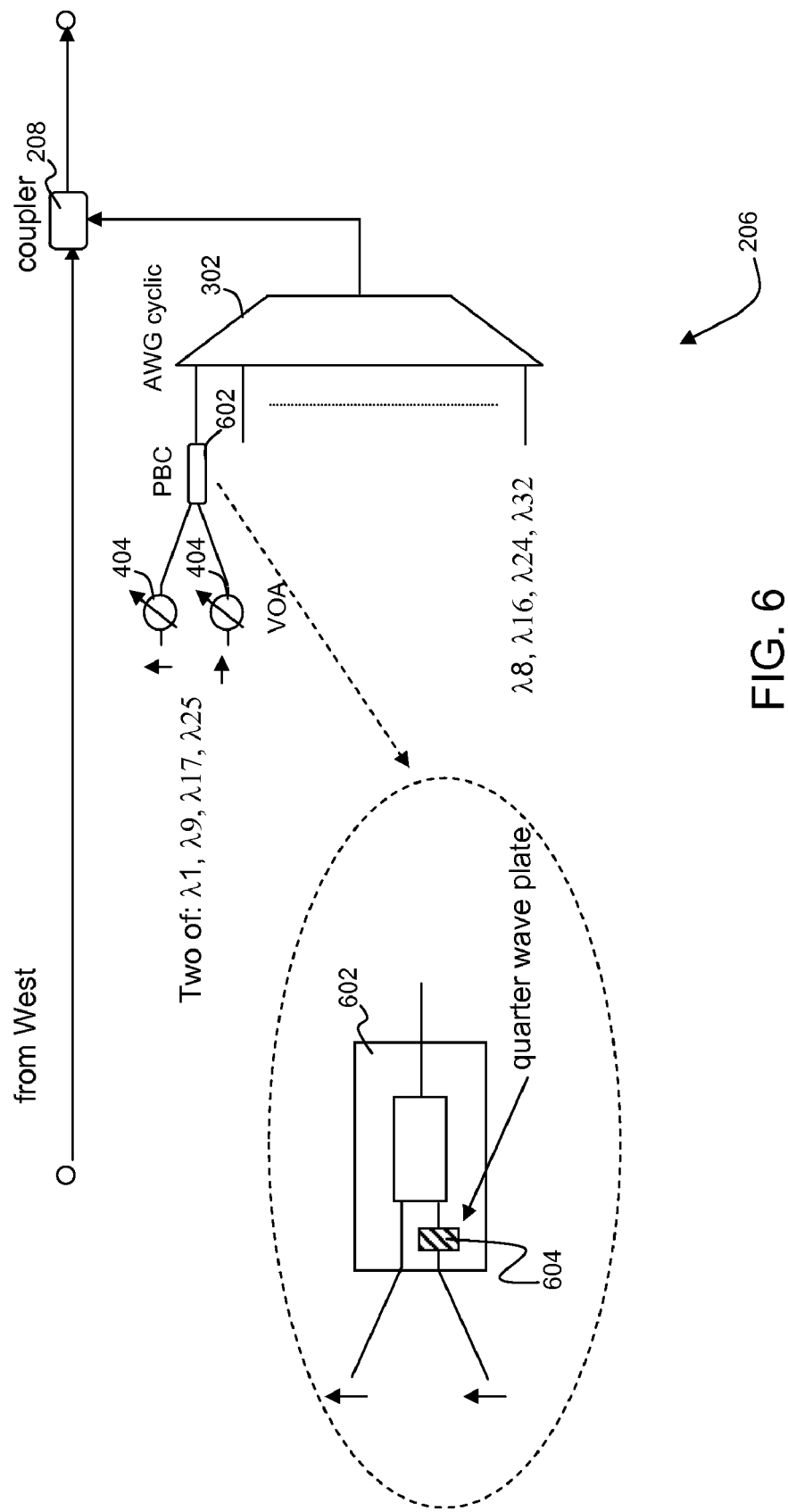
FIG. 6 depicts an add module according to a fourth embodiment of the present invention.

FIG. 6 depicts another variation on the add module of FIG. 4 according to one embodiment of the present invention. In FIG. 6, a polarization beam combiner 602 combines the two input wavelengths for each input port of cyclic AWG 302. The arrangement of FIG. 6 assumes that the two input wavelengths are polarized orthogonally to one another. This can be accomplished by specifying the corresponding transmitters to output orthogonally polarized signals or, alternatively by specifying that they share the same polarization and that a quarter waveplate 604 be introduced as discussed with reference to FIG. 3. The arrangement of FIG. 6 provides very low insertion loss and 0 dB OSNR impairment due to the operation of PBC 602. For the arrangement of FIG. 6, capacity is 50% and flexibility is 5%.

Figure 7:
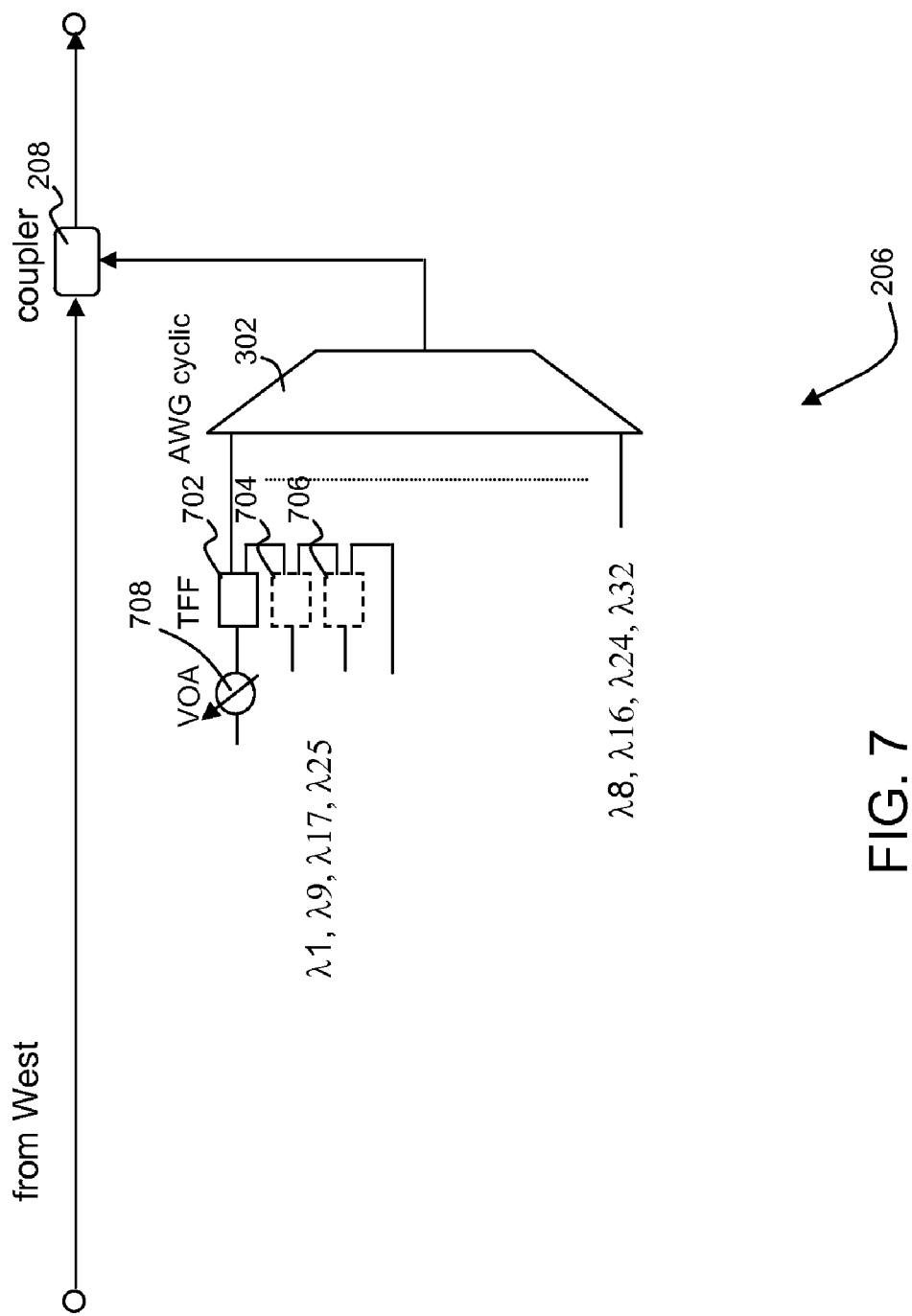
FIG. 7 depicts an add module according to a fifth embodiment of the present invention.

FIG. 7 depicts a further alternative add structure that can provide a variable degree of flexibility according to one embodiment of the present invention. Here each input port of cyclic AWG 302 can have two, three, or four associated wavelength inputs. Thin film filters (TFFs) 702, 704, and 706 are cascaded together with TFFs (single-channel bandpass filters) 704 and 706 being optionally installed. Each TFF has two inputs and a single output. If only TFF 702 is present at each input port then two wavelengths may be input to a single AWG port and there is thus a capacity of 50% and a flexibility of 5%. If TFF 704 is added at each input port, then three wavelengths may be introduced and there is a capacity of 75% and a flexibility of 60%. The additional inclusion of TFF 706 then provides 100% capacity and flexibility. It will be appreciated that other levels of flexibility and capacity may be achieved by using disparate numbers of TFFs at each input port. A VOA 708 is optionally installed at the wavelength input of TFF 702. Insertion loss for the added wavelengths is relatively low and there is no OSNR impairment.

Figure 8:
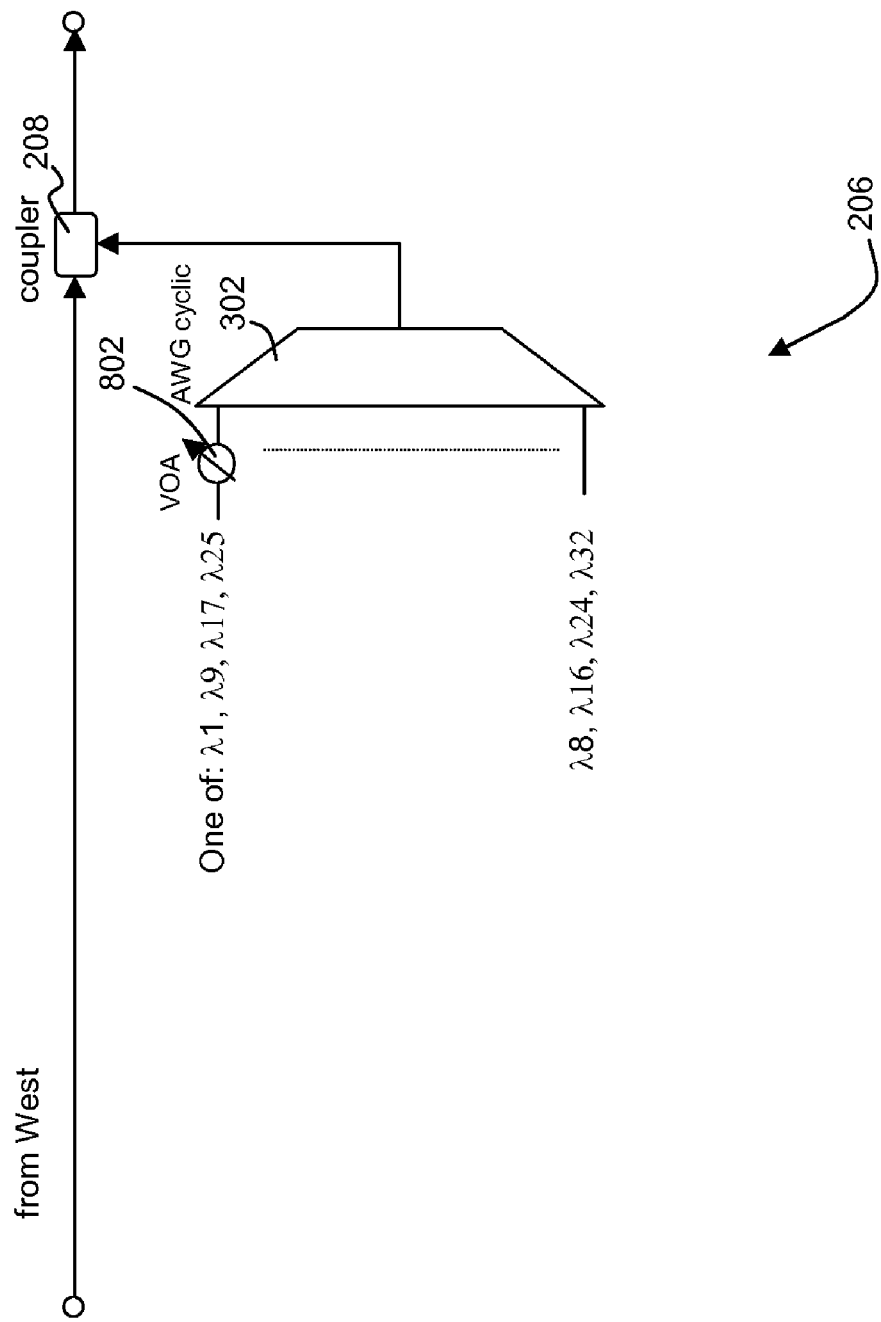
FIG. 8 depicts an add module according to a sixth embodiment of the present invention.

FIG. 8 depicts an alternative add structure having 25% capacity and 0.0091% flexibility according to one embodiment of the present invention. One of four wavelengths may be input to each of the input ports of cyclic AWG 302. An optional VOA 802 is included for each input port. The added wavelengths experience very low insertion loss and there is no impairment of OSNR. Although this implementation provides less flexibility, component cost is relatively low.

Drop Module

Figure 9:
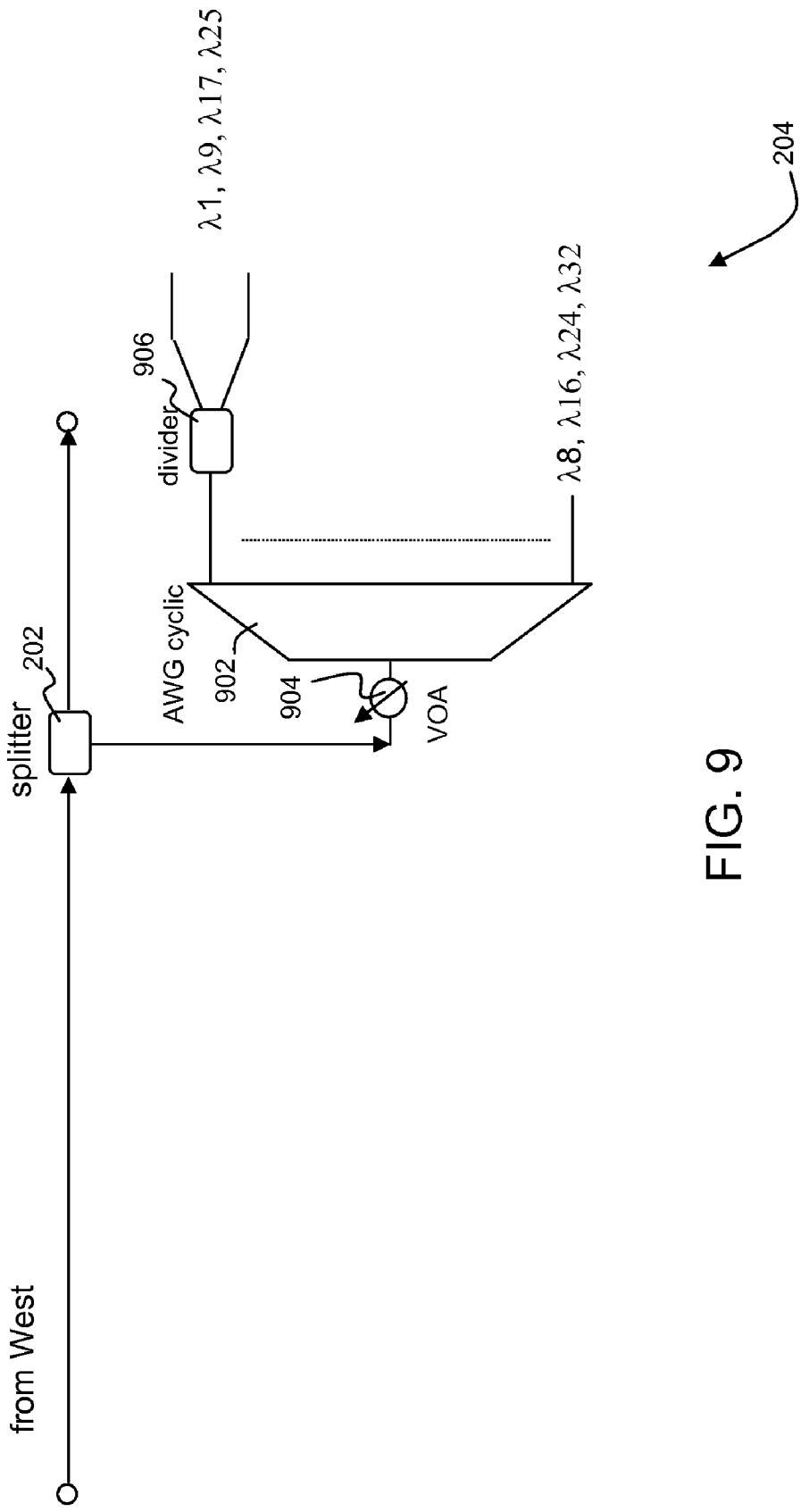
FIG. 9 depicts a drop module according to a first embodiment of the present invention.

FIG. 9 depicts a drop structure architecture according to one embodiment of the present invention. Here, a cyclic AWG 902 is used as a demultiplexer. The input to cyclic AWG 902 is a tapped-off portion of the west-to-east signal. The input to cyclic AWG 902 may optionally pass through a VOA 904. Each output port of AWG 902 carries N/P wavelengths spaced at P times the overall grid spacing. Here N=32 and P=8. Cyclic AWG 902 both separates and filters the wavelengths from the single input port to the P output ports. In the depicted example, the wavelength grid has 32 wavelengths. Depending on traffic demands anywhere from 1 to 32 of these wavelengths may actually be operational and present at the input to cyclic AWG 902. Each output port presents from one to four of wavelengths depending on which wavelengths are actually operational. Each output port may have an associated divider 906 which further separates the wavelengths. As will be shown by way of example, there are many possible implementations of divider 906.

Figure 10:
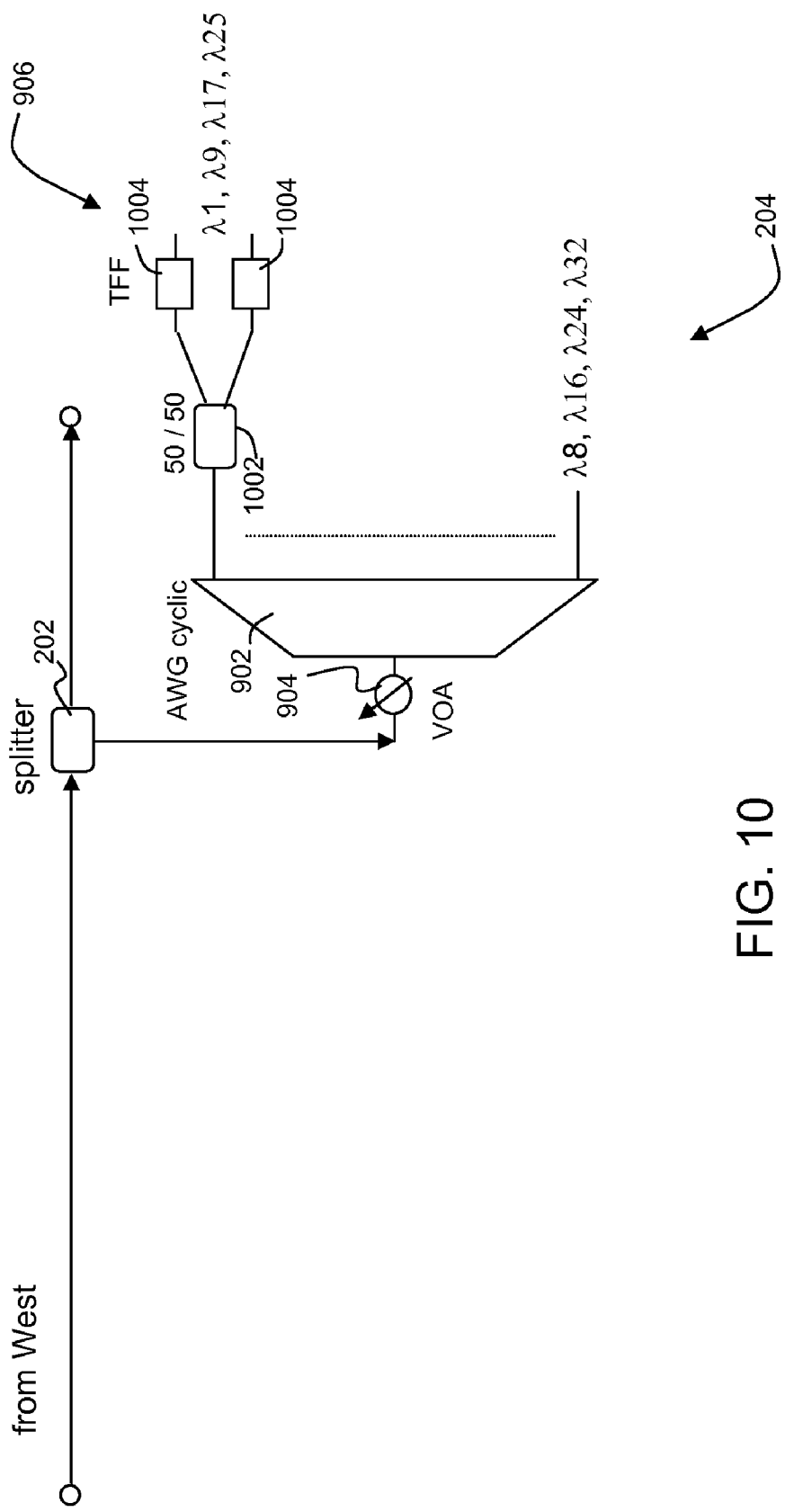
FIG. 10 depicts a drop module according to a second embodiment of the present invention.

In FIG. 10, divider 906 is implemented as a 50/50 optical splitter 1002 followed by two parallel TFFs 1004. Each TFF 1004 selects a single wavelength. Two of the four potentially available wavelengths may be received for each of the P output ports of cyclic AWG 902. This represents a drop capacity of 50% and a drop flexibility of 5%. Splitter 1002 introduces a certain amount of insertion loss.

Figure 11:
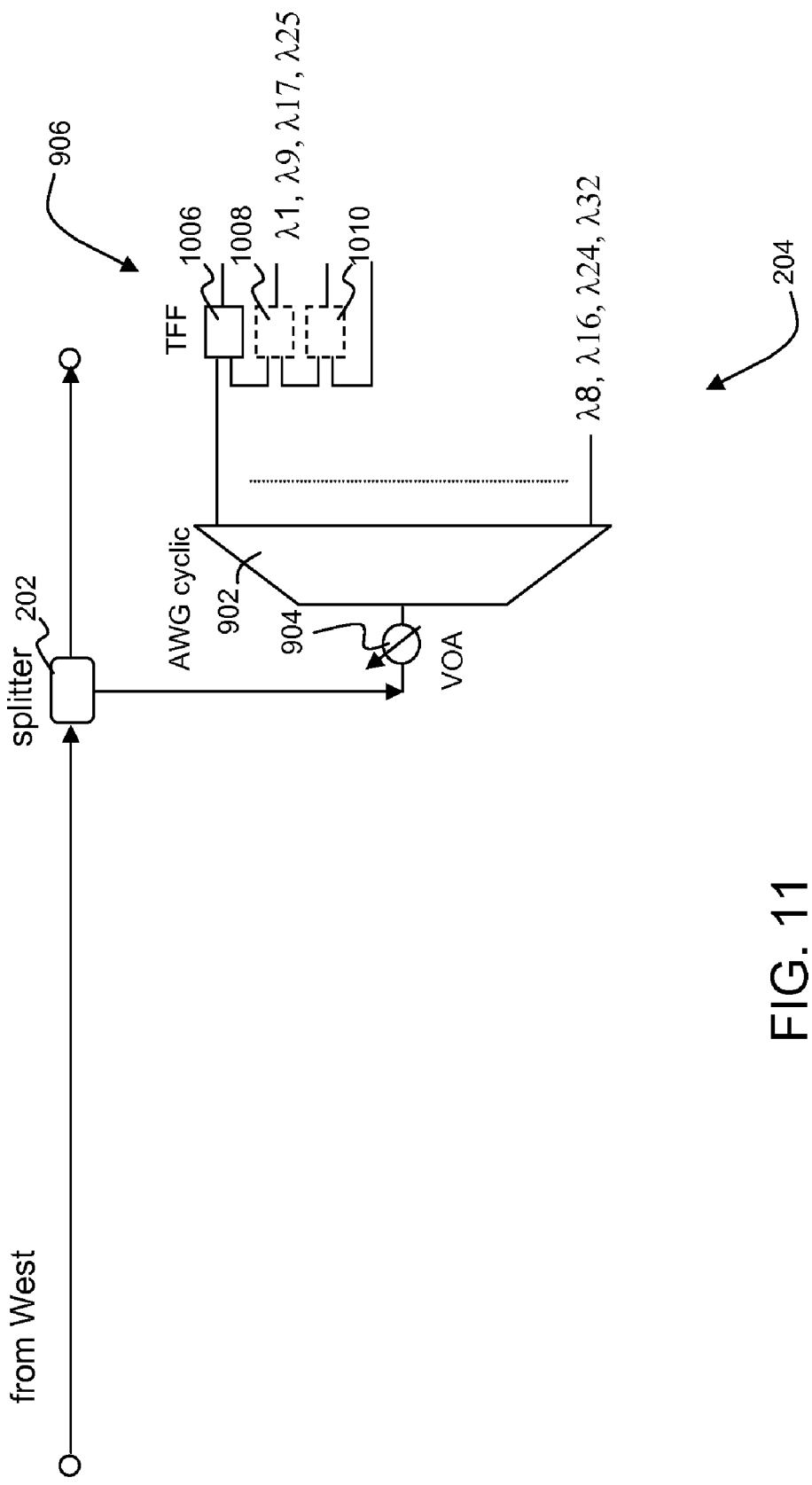
FIG. 11 depicts a drop module according to a third embodiment of the present invention.

FIG. 11 depicts an alternative divider structure for 906 that exploits cascaded TFFs. Depending on how many TFFs are installed at each output port, one may implement 50%, 75%, or 100% capacity, corresponding to 5%, 60%, and 100% flexibility, respectively. Other levels of capacity and flexibility may be arrived at by using varying numbers of TFFs on each of the P output ports of cyclic AWG 902. The TFFs 1006, 1008, and 1010 are connected in a cascade fashion, each device having a single input and two outputs. The capacity and flexibility figures vary as TFFs are added as in the add module embodiment of FIG. 7. This arrangement provides very good insertion loss characteristics.

Figure 12:
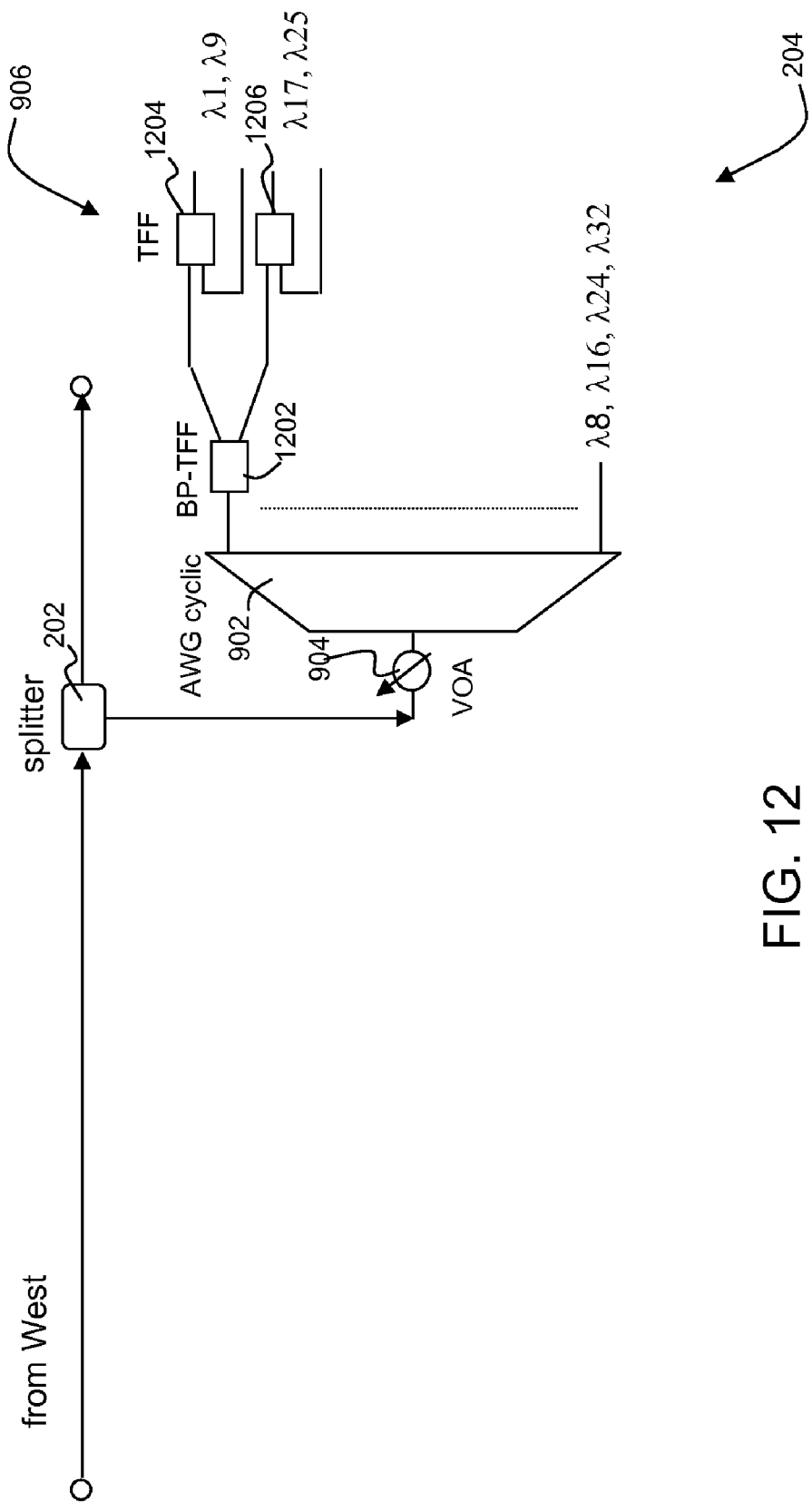
FIG. 12 depicts a drop module according to a fourth embodiment of the present invention.

FIG. 12 depicts another alternative structure for divider 906. At each of the P output ports, there is a connected BP-TFF 1202. Bandpass thin film filter 1202 has two outputs, each carrying half of the grid spectrum. The outputs are fed to TFFs (single-channel bandpass filters) 1204 and 1206 respectively. TFFs 1204 and 1206 further filter and separate into individual wavelengths. This design thus provides 100% capacity and flexibility. This design also provides very low insertion loss.

Modularity

Figure 13:
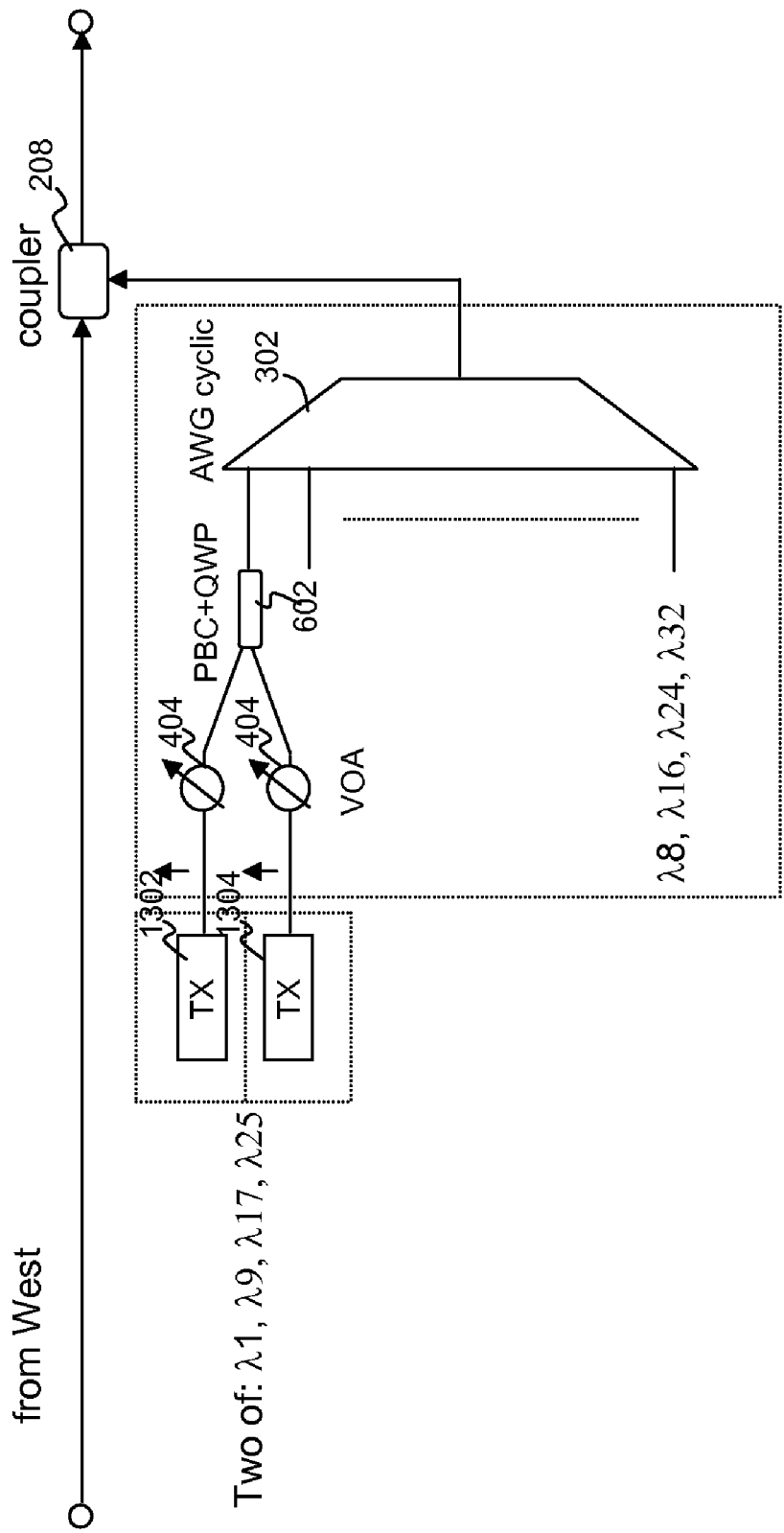
FIG. 13 depicts how an add module may be integrated to provide a low cost, high performance upgrade path according to one embodiment of the present invention.

The add and drop structure designs as discussed above can provide beneficial modularity on various levels. FIG. 13 shows how modularity can be achieved using the add structure design shown in FIG. 6. The design of FIG. 6 provides 50% capacity and 5% flexibility. Two of four possible wavelengths may be added via a single input port of cyclic AWG 302. FIG. 13 thus depicts two optional transmitters 1302 and 1304 for a single input port of AWG 302. Transmitters 1302 and 1304 have the same output linear polarization state. The optical transmitters 1302 and 1304 are selectably installed depending on current need. Any particular input port may have 0, 1, or 2 transmitters installed. As demand increases, more transmitters are installed on the various input ports. Up to 16 of the available wavelengths may be populated with transmitters. This approach can reduce cost and insertion losses.

Figure 14:
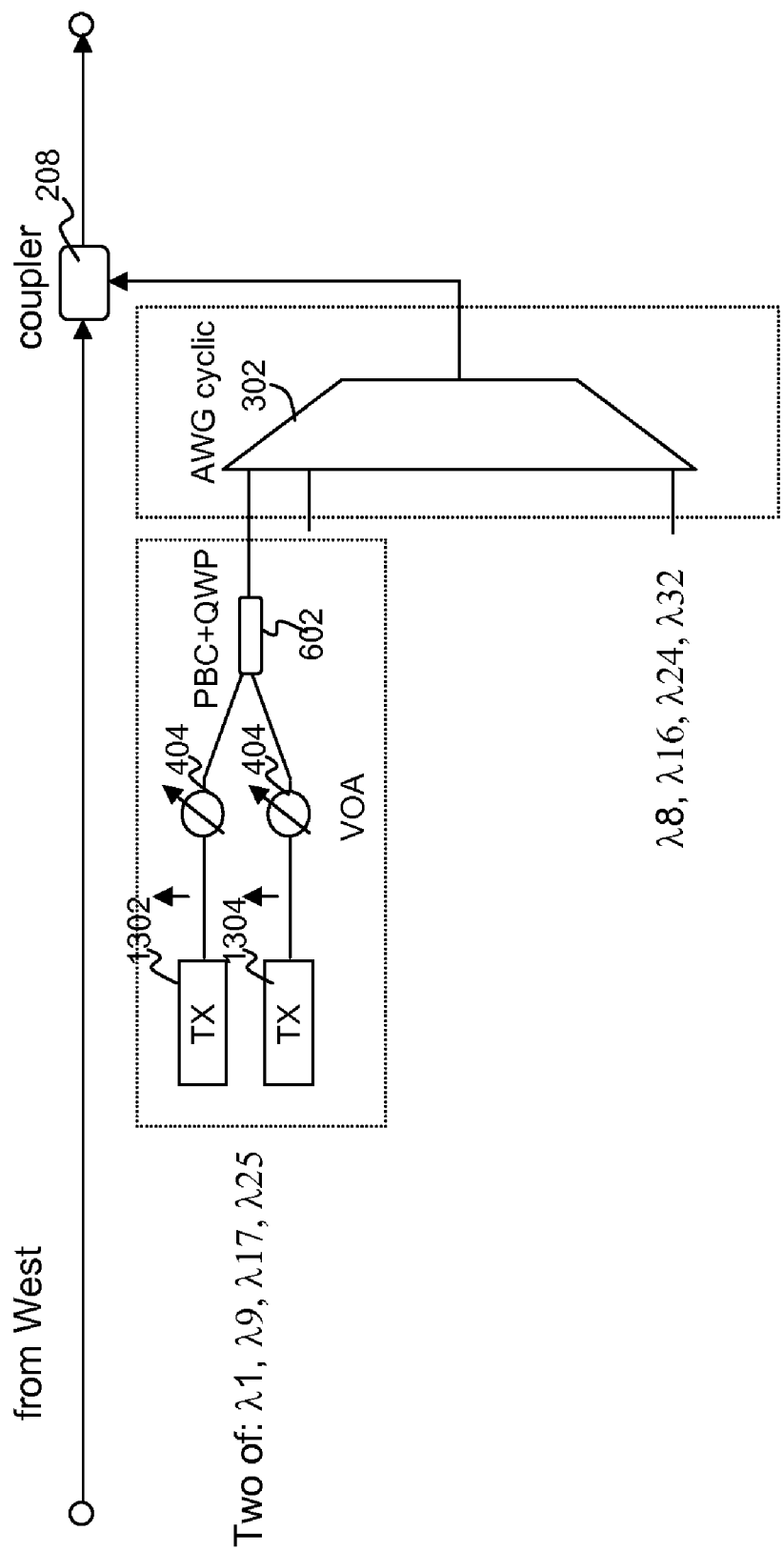
FIG. 14 depicts how an add module may be integrated to provide a low cost, high performance upgrade path according to an alternative embodiment of the present invention.

FIG. 14 depicts how the modularity concepts of FIG. 13 can be extended to cover components other than the transmitters. Here, on each input port a single module, if present, holds the transmitters 1302 and 1304, the optional VOAs 404 and the polarization beam combiner 602. Each such module provides the capability for two wavelengths. Wavelengths can thus be added two at a time, as needed. In this way, the costs of not only the optical transmitters but also those of other components can be postponed until justified by traffic demand. Furthermore, the optical connection to the input of AWG 302 is not polarization state dependent. It will be appreciated that many comparable modularity schemes can be implemented on both the add structure and drop structure sides.

Compared to the prior art, embodiments of the present invention provide lower optical insertion loss (and thus highly beneficial avoidance of the need to use per-channel optical amplifiers), better optical noise performance, and a cost-efficient family of architectures that allow installation and upgrade costs to be distributed over time to match traffic demands. Furthermore, many of the components used such as the cyclic AWG, polarization beam combiners, VOAs, and quarter waveplates may be integrated on the same optical chip. Also, compared to add and drop structures that employ conventional non-cyclic AWGs, embodiments of the present invention provide lower cost and lower add structure insertion loss for capacity levels up to 50%.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. Apparatus for adding wavelengths to a WDM signal, said apparatus comprising:
a plurality of optical combination structures that each combines a set of N/P wavelengths into a single combined optical signal while maintaining a linear orthogonal polarization state for pairs of said wavelengths; wherein P is greater than one, N is a total number of wavelengths to be added to said WDM signal and where each of said N/P wavelengths is coupled to said optical combination structure by a separate input, and wherein each pair of said N/P wavelengths are input to said optical combination structure with linear orthogonal polarization, said optical combination structure further comprises:

means for reducing noise level by causing the noise from each input to add incoherently; and an interferential filter for combining two adjacent multi-wavelength subbands of said N wavelengths;

a first optical device including P input ports that combines a single combined output signal at an input at each of said P input ports into a single output signal, each of said P input ports accepting non-overlapping interleaved sets of N/P wavelengths; and an optical coupler that combines said single output signal with said WDM signal.

2. The apparatus of claim 1 wherein said first optical device comprises a cyclic AWG.

3. The apparatus of claim 1 wherein said first optical device comprises an optical interleaver.

4. The apparatus of claim 1 wherein N is a total number of wavelengths of a wavelength grid of a WDM communication system carrying said WDM signal.

5. The apparatus of claim 1 wherein optical energy is present at all of said P input ports.

6. The apparatus of claim 1 wherein optical energy is not present at least one of said P inputs.

7. The apparatus of claim 1 wherein said optical combination structure further comprises:

a variable optical attenuator;

a polarization beam combiner; and an optical filter.

8. The apparatus of claim 7 wherein said optical filter comprises a bandpass thin film filter.

9. The apparatus of claim 7 wherein said optical combination structure comprises a polarization beam combiner and a quarter waveplate where said pair of wavelengths share a polarization on at least one input.

10. The apparatus of claim 1 wherein said optical combination structure comprises a polarization beam combiner.

11. Apparatus for adding wavelengths to a WDM signal, said apparatus comprising:

an optical structure that combines a set of N/P wavelengths into a single combined optical signal while maintaining a linear orthogonal polarization state for pairs of said wavelengths and while adding optical noise incoherently to minimize optical noise; wherein P is greater than one, N is a total number of wavelengths to be added to said WDM signal and where each of said N/P wavelengths is coupled to said optical structure by separate input;

means for combining said optical energy input to said at least one of P inputs and outputting said combined optical energy from said first optical device; and means for combining said combined optical energy with said WDM signal.

12. The apparatus of claim 11 wherein means for combining said wavelength pairs while adding optical noise incoherently to said single output signal to minimize optical noise comprises:

a variable optical attenuator;

a polarization beam combiner; and an optical filter.

* * * * *